J. J. Savage.

Impd Cooking Stove.

No 2828 Reissued Dec. 31, 1867.

Witnesses
Wm A Greene
Austin F. Park

Inventor
J. J. Savage

United States Patent Office.

J. J. SAVAGE, OF TROY, NEW YORK.

*Letters Patent No.* 61,956, *dated February* 12, 1867; *reissue No.* 2,828, *dated December* 31, 1867.

IMPROVEMENT IN COOKING-STOVES.

The Schedule referred to in these Letters Patent and making part of the same.

TO ALL WHOM IT MAY CONCERN:

Be it known that I, J. J. SAVAGE, of Troy, in the county of Rensselaer, and State of New York, have invented certain new and useful Improvements in Cooking-Stove Furnaces.

The object of this invention is to produce a more perfect combustion of bituminous coals or fuels, and the gases evolved therefrom, in stove-furnaces, especially in cooking-stove furnaces, to thereby prevent the formation of carbonaceous smoke, with its obstructive deposits of soot in stove-flues, which impairs the baking properties, draught, and good operation of cooking-stoves.

As the said invention consists in an improved construction of the furnace part of stoves, it may therefore be applied with advantage to heating-stoves or furnaces, in manner substantially as described and shown separately hereof. Now, I do hereby declare that the following is a full and exact description of the said invention in cooking-stove furnaces, reference being had to the annexed drawings and the letters of reference marked thereon, making a part of this specification, in which—

The same letters refer to like parts in each of the said figures.

Figure 1:
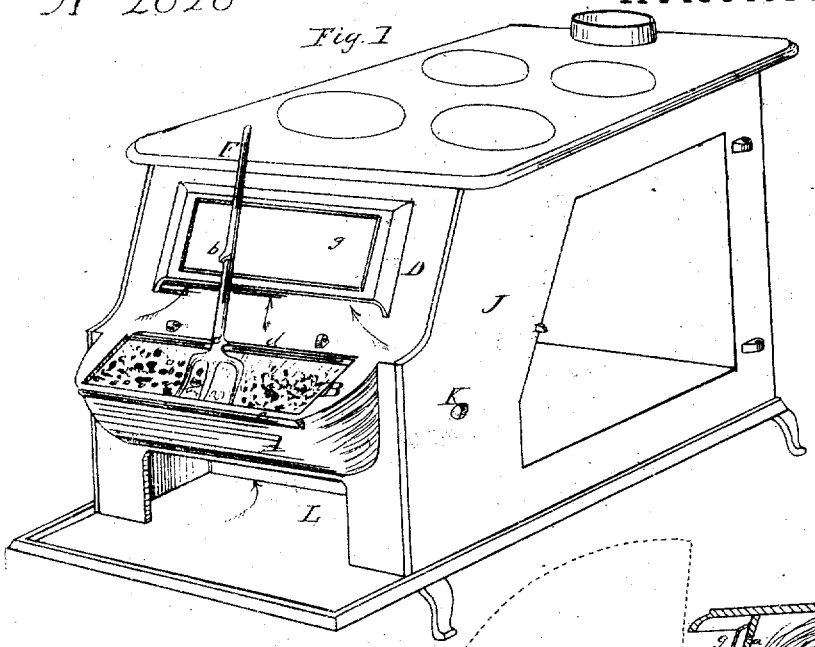
Figure 1 is a perspectivo view of a cooking-stove, with my improvements added thereto.

The principle of operation of this said invention is, to introduce the fresh fuel without passing it through the combustion or flame-chamber of the furnace, or through any other intermediate conveying-devices, as fuel-chambers or reservoirs, directly into the fire-box; by forming for its reception clear, vacant room or spaces in, below, and between a body of ignited fuel or live coke therein, by the new-invented means, and in manner substantially as hereinafter fully set forth, thereby causing the added fresh fuel to be ignited or coked under and between live or red-hot coke or coals, which method or process causes all combustible gases evolved from the fresh fuel to become highly heated as they pass upward through the live coke into the combustion or flame-chamber of the furnace; and it also attains and maintains an even high temperature of heat within said chamber that prevents said gases from cooling below an inflammable degree, and mixing with a proper supply of air admitted therein, they ignite or inflame till perfectly consumed, thereby preventing the formation of carbonaceous or fuliginous smoke.

The above-stated principle of operation is put into practical use by my new-invented improvements in stove-furnaces, the same substantially as now to be fully set forth, to wit:

The first part of my said invention consists in the location of the fuel doorway or feed-mouth of stove-furnaces below and forward of the combustion or flame-chamber of the same, and in immediate position contiguous to or adjoining the fire-box thereof, such, that all fresh fuel may be cast or thrown through said doorway directly into said fire-box, without passing into or through the combustion or flame-chamber of the furnace, or through any other interposed conveying-device to reach the said fire-box, substantially as and for the purposes as hereinafter fully described.

The second part of my said invention consists in the construction and employment, to operate in combination with the aforesaid located fuel doorway of furnaces, of a lever-feeder or lifter, for the purposes of lifting backward and upward, towards the combustion or flame-chamber thereof, a portion of the fully-ignited or red-hot coke or coals from the fire-box below, in manner substantially as hereinafter fully shown, thereby making clear vacant room or spaces in, below, and between said body of ignited or live coals in the fire-box, within which are directly cast or fed, through the aforesaid located fuel-doorway, fresh charges of coal or fuel, in the usual quantities, and from time to time, as may be required in operating stove-furnaces.

By these respective foregoing parts of my said invention, the feeding of fresh fuel into andthrough the combustion or flame-chamber of furnaces, to reach the fire-box thereof, is avoided, and thus is prevented the consequent cooling of said chamber by fresh fuel lying within or next it, which would, until the fresh fuel became coked, cool the combustible gases rising therein below the inflammable degree; hence they failed to ignite or continue ignited until consumed, and, in consequence thereof, would pass into stove-flues, in the form of carbonaceous smoke. But by this new peculiar manner or method of feeding furnaces, there is maintained in the combustion or flame-chamber thereof a sufficiently high degree and uninterrupted temperature of heat, that, together with a properly-introduced supply of atmospheric air thereunto, attains perfect combustion of all inflammable gases rising hot from the coking or igniting fuel lying below and between a body of live or red-hot coke in the fire-box thereof; hence no sooty or fuliginous flame or smoke is formed.

The third part of my said invention consists in the arrangement of a fire or guard-plate in combination with a front plate of stove-furnaces, and in position above the fuel-doorway, and about opposite the combustion or flame-chamber thereof, in manner substantially as hereinafter set forth, for the purpose of protecting such part of said front plate from the intense heat of the fire. By this part of my said invention the front plate of the furnace is made more durable, and the said fire or protection-plate, when worn out, is easily removed from its place and a new plate substituted without displacing the said front plate.

The fourth part of my said invention, when combined with the aforesaid located fuel-doorway of stove-furnaces, consists in the arrangement of the front plate thereof in an inclined or slanting position, such as to overhang more or less the combustion or flame-chamber, and fire-box thereof, in manner substantially as hereinafter fully described. By this part of my said invention the orifices or apertures in said plate, for admitting atmospheric air into the combustion or flame-chamber thereof, are placed in a better position to said chamber, such, that the incoming air is more intimately and quickly mixed with the rising gases therein, thereby better promoting their combustion.

To enable others skilled in the art to make and use my aforesaid invention and improvements, I will now proceed to fully describe its construction and operation, to wit:

In the following description the words "combustion or flame-chamber" designate that part of the furnace wherein the combustible gases arising from the fuel below are consumed, and such part is marked *c* on the annexed drawings, and the words "fire-box" designate that part of the furnace wherein the solid portions of fuel are consumed, and such part is marked on the said drawings by the letters A Y.

Figure 2:
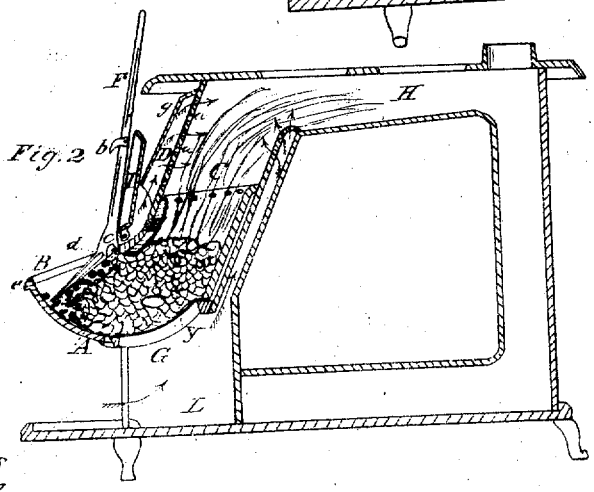
Figure 2 is a vertical longitudinal sectional view of fig. 1.

I cause the front part, A, of the fire-box of stove-furnaces to project more or less outward or forward of the upper front plate D, and below and forward of the combustion or flame-chamber C thereof, by a manner of construction of said front and plate, substantially the same as shown in figs. 1 and 2 of annexed drawings. The top of said projecting part of the fire-box may be inclined or sloped more or less downward and outward, about as shown in said figs. 1 and 2. The amount or degree of projection of said fire-box A part is sufficient when it serves to prevent the live coals or fuel from falling out when renewing the fire with fresh fuel. In this top and projecting part is located the fuel-doorway or feed-mouth B of the furnace, in such a manner that it is substantially below and forward of the combustion or flame-chamber C thereof, and immediately in front, contiguous to or adjoining the fire-box A, so as to be operated in manner substantially and for the purposes as hereinafter set forth. This feed-mouth or fuel-doorway extends nearly the whole width or length of the fire-box, and may be closed either by a hinged door, I, or by a removable cover, or by sliding doors. The front upper plate D of the furnace extends the whole width of the stove. Its lower part is curved outward and downward so as to join with or form the projecting part aforesaid, substantially in manner as shown in said figs. 1 and 2. Upon said front plate is placed or constructed a chamber or hood, *g*, open at its bottom end for admitting a free supply of atmospheric air, and through the said plate D is made a series of apertures, *a a*, which admit jets of said air into the combustion or flame-chamber C. Said front plate D is arranged in an inclined or slanting position relatively to the furnace, and such as to overhang more or less the combustion or flame-chamber C of the same. This position is given to said plate in order that the air-apertures *a a* may be in a better position for quickly and intimately distributing or intermixing the incoming air-jets with the rising combustible gases in said combustion or flame-chamber, thereby causing a more perfect combustion of said gases. Arranged in combination with said plate D is a fire or guard-plate, E, and in position about opposite the combustion or flame-chamber C and above the fuel-doorway B of the fire-box. This plate is supported or held in its proper position for use by the other fire-plates or linings of the fire-box, as shown in fig. 2; or it may be directly secured to said plate D by bolts, or in any known way which admits of its convenient removal from said front plate when worn out, and the substitution of a new plate without disturbing or displacing said front plate. G is the fire-grate. L is the ash-pit. H the main direct flue. J the sides, which, with a top plate, flue, and all other necessary plates or parts required in fully constructing stoves, may be made in any of the usual known ways or manner. The main exit-flue H is so made as to gradually enlarge its dimensions or have a flaring form from its back end to its forward end, where it connects with the flame-chamber C, thereby providing more space for the expansion and combustion of gases, and retarding their escape until consumed or fully ignited. F is a lever, feeder, or lifter, for feeding or lifting the live fuel or red-hot coke, or a portion thereof, in the fire-box, backward and upward toward the combustion or flame-chamber C of the furnace, to form thereby clear vacant room or spaces in and between the live fuel or red-hot coke in said fire-box. This feeder or lifter is provided with substantially a fulcrum-hook or hooks, *c*, by which it is held, in working, upon a fulcrum on the edge of the aforesaid fuel-doorway B. In practice, to get more steadiness in operation, I prefer to use two hooks, arranged a little apart from each other, and at equal distances from the ends of said feed-lever; or one broad or wide fulcrum-hook may be used instead of two narrow ones. A catch or holding-down hook, *b*, may be used. The fire-end of this feed-lever may be made with two or more prongs, substantially as shown, by which to lift or feed upward and backward towards the flame-chamber the live coke from the fire-box. Upon an edge of the aforesaid located fuel-doorway B is arranged a fulcrum, ridge, or bearing, *d*, extending about the length of said doorway, and on the outer edge or side of said doorway may be arranged a projecting ridge, *e*, substantially as shown, which are respectively for the purposes of supporting said lever-feeder while in operation, and for holding the same in position, if so desired, while fresh fuel is cast into the fire-box.

The arrows in the annexed drawings indicate currents of air moving into the fire-box and combustion or flame-chamber of the furnace.

Figure 3:
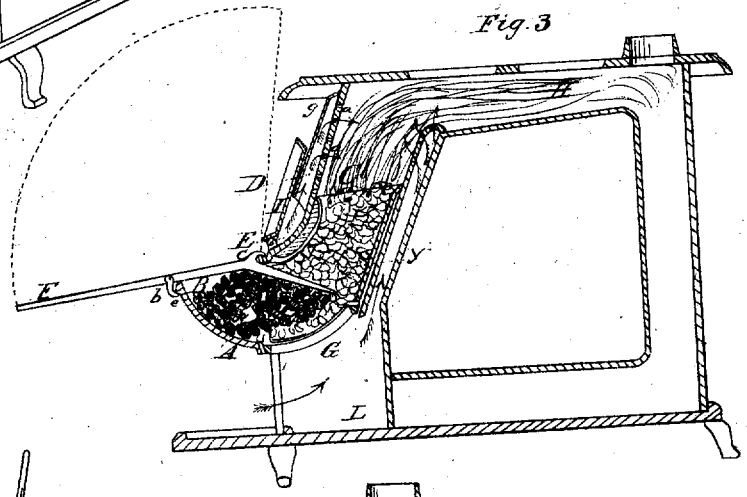
Figure 3 is a similar view of fig. 1, showing the improved manner of feeding fresh fuel into the fire-box of said stove.

This improved stove-furnace is operated in manner as follows, to wit: Fire being kindled in the fire-box A Y, coal is thrown thereon; the fuel-doorway B is then closed, the coal ignites, and is soon converted into live or red-hot coke, which fills the fire-box in manner about as shown by the red coloring in fig. 2 of the annexed drawings. The said fuel-doorway B is then opened, and the live or red-hot coke loosened or broken up, if necessary, with feed-lever F, which is then placed in position for use, with its fulcrum-hooks *c* resting upon the fulcrum-ridge or bearing *d*, substantially as shown in said figure. The handle of said feed-lever or lifter is now turned downward, so as to about touch the front edge of the fuel-doorway B, and is held down, or it may be hooked down by a hook, *b*, hooking on the catch-ridge *e*. This operation lifts a portion of the live coke or coals backward and upward towards the combustion or flame-chamber C of the furnace, thereby forming clear vacant room or places in, between, and below the live or red-hot coke in the fire-box thereof. Into this vacant place is directly cast or fed, through the aforesaid located fuel-doorway B, the fresh supply of coal, in manner substantially as shown by the black colors in fig. 3 of annexed drawings. When said vacant place or room is filled with fresh coals, the lever F is easily withdrawn from its position, and applied in like manner and by like operations to feed the whole extent of fire-box, two or three successive operations of said lever being sufficient to feed with fresh fuel the whole length of said fire-box.

By this new peculiar manner or method of feeding fresh fuel into furnaces, the casting of the same into, or through, or next the combustion or flame-chamber thereof, is avoided, and therewith all liability to disturb or lessen the high temperature required in said flame-chamber to perfectly consume the gases rising therein; because there may be always, while operating the furnace, a bed of live coals or coke next to said chamber, which, with a proper introduction of air thereinto, and passing the combustible gases evolved from fresh fuel through said bed of live coals, so that they shall thereby enter the flame-chamber C highly heated, and therein, from the slanting position of the perforated plate of said chamber, the said heated gases are quickly and intimately mixed with air, which causes them to inflame and be perfectly consumed, thereby preventing any fuliginous flame, with its carbonaceous smoke, from being formed; consequently the flues and exit-pipes of stoves or furnaces do not become fouled with soot, to impede the draught, baking-properties, and general good operation of the same.

What I claim as my invention, and desire to secure by Letters Patent, is—

1. I claim the location of a fuel-doorway or feed-mouth, B, of stove-furnaces, substantially below and forward of the combustion or flame-chamber C thereof, in such immediate or contiguous position to the fire-box A Y thereof, as to admit of fresh fuel being fed thereinto, in manner substantially as hereinbefore described for the purposes set forth.

2. I claim the extension of the fire-box A forward of the combustion or flame-chamber C of stove-furnaces, and immediately under or contiguous to the aforesaid located fuel-doorway B thereof, in manner substantially as herein described for the purposes set forth.

3. I claim a lever-feeder, F, substantially as described, when operated in combination with and through said located fuel-doorway B of stove-furnaces, in manner substantially and for the purposes as herein set forth.

4. I claim providing a feed-lever, F, with a fulcrum-hook, *c*, or an equivalent therefor, when used in combination with a fulcrum-ridge or bearing, *d*, arranged on the edge of the aforesaid located fuel-doorway B of stove-furnaces, substantially as and for the purposes set forth.

5. I claim, in combination with the front plate D of stove-furnaces, a fire or guard-plate, E, when arranged in position above the aforesaid located fuel-doorway B of the fire-box thereof, and about opposite the combustion or flame-chamber C, substantially as and for the purposes set forth.

6. I claim the arrangement of the front plate D of stove-furnaces in an inclined or slanting position, in combination with the aforesaid located fuel-doorway B, such as to overhang the combustion or flame-chamber C and fire-box thereof, substantially as and for the purposes set forth.

7. I claim the combination of the aforesaid located fuel-doorway B, the fire-box A Y, the combustion or flame-chamber C, and the lever-feeder F, as applied to stoves, to operate in manner substantially as and for the purposes herein described.

8. I claim the peculiar manner or method of feeding or introducing fresh fuel directly into the fire-box of stove-furnaces, by forming, for its reception, clear vacant room or places in, below, and between ignited fuel or live coke therein, by the conjoint means substantially of a feed-aperture or doorway, B, located as described, and of a feed-lever, F, or equivalents therefor, operating substantially as herein set forth, for the aforesaid purposes.

J. J. SAVAGE.

Witnesses:

WM. A. GREENE,

AUSTIN F. PARK.